June 2, 1959 F. P. MASON 2,889,398
FACSIMILE RECORDING APPARATUS
Filed April 24, 1956
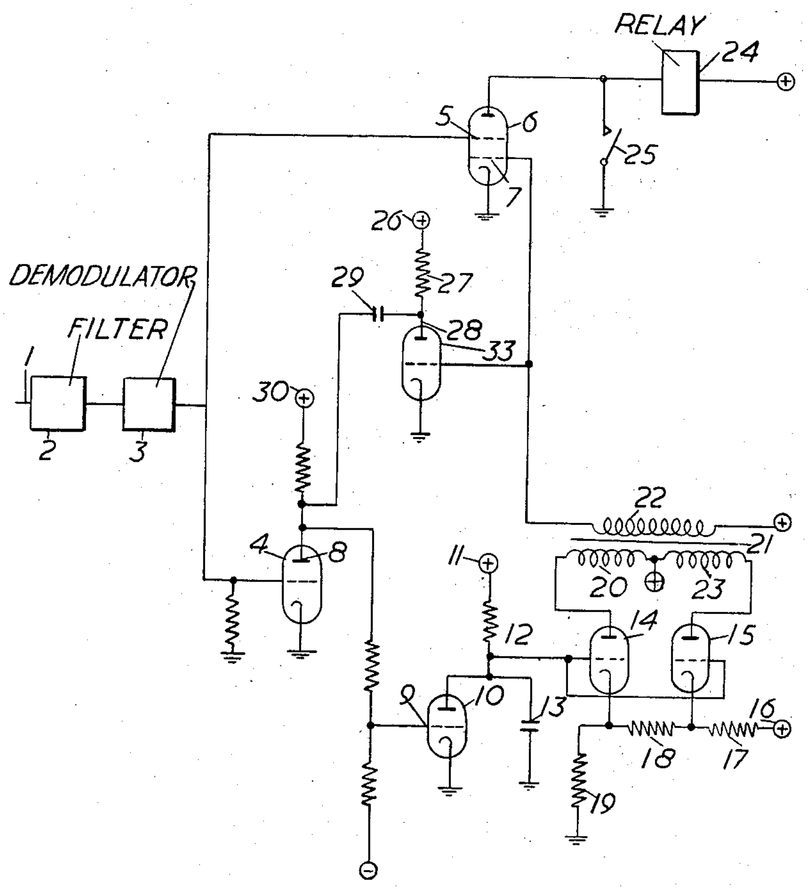
Inventor
F. P. MASON
By Robert Harding Jr.
Attorney 2,889,398

FACSIMILE RECORDING APPARATUS

Frederick Percival Mason, Croydon, England, assignor to Creed & Company Limited, Croydon, England, a British company Application April 24, 1956, Serial No. 580,194

Claims priority, application Great Britain May 4, 1955

4 Claims. (Cl. 178—4.1)

The invention relates to facsimile recording apparatus and has for its object the provision of means whereby line noise pulses are prevented from causing false starts.

In facsimile transmission systems it is necessary to send a calling signal from a transmitter which has a message or picture to send in order to start the recorder into operation. It has been found that, for facsimile systems operating over long telephone lines, the most satisfactory calling signal is a series of pulses of 1,000 c./s. tone, each pulse having a given duration and there being a predetermined interval between successive pulses.

In order that protection may be afforded against line background noise, a relatively narrow band 1000 c./s. filter must be provided in the calling signal detector circuit of a recorder. Unfortunately, this filter has the property of converting isolated switching clicks into 1000 c./s. pulses of approximately the same duration as the calling pulses.

Since the detector must respond to genuine calling pulses, it is unable to ignore the false pulses resulting from clicks, and false starts might occur. It is the object of the present invention to provide means for preventing the detector from starting the recorder except on the receipt of genuine calling pulses.

In order to devise a method of preventing false starts, cognisance must be given to the fact that false signals differ from genuine ones principally because they are isolated, or occur at random intervals, whereas genuine signals form part of a regular succession of pulses and so are always followed by a similar pulse after a predetermined interval. Therefore any pulse can be identified as genuine or false by the result of a test made a predetermined time after its arrival to ascertain if another pulse has followed.

Since the identity of a pulse cannot be determined at the time of its arrival, the fact of its arrival must be registered, and a process begun which will result in the identity test being made after a specified interval. If the result of the test indicates that the pulse was genuine, the recorder may be set into motion. If the result indicates that the pulse was false, its registration is cancelled.

The present invention therefore provides facsimile recording apparatus comprising a recorder means for registering a first incoming pulse, means for generating a testing pulse at a predetermined time after the registration of said first incoming pulse, means operative in response to the combination of said testing pulse and a second incoming pulse for starting said recorder, and means operative in response to said testing pulse alone for cancelling the registration of the first incoming pulse.

It will be understood that this method of attaining security against false starts cannot be completely relied upon, as it is possible that a second false signal might by chance follow the first after the specified interval. For most commercial applications, however, this possibility is so remote that the percentage of false starts which would arise from this cause would be small enough to be negligible.

In cases where a higher degree of security is necessary, it may be arranged that, in the same way as the first pulse may be tested by seeking a second, any second pulse found may in turn be tested by seeking a third, and cancelling the registration of the first two if no third pulse is found. This principle may be extended until the probability of a false start is reduced to the desired extent.

In order to derive the maximum benefit from a given number of tests, it is proposed that the period occupied in ascertaining whether a pulse is present or absent shall be as short as practicable.

The invention will be more fully understood from the following description taken in conjunction with the accompanying drawing, the single figure of which shows signal detector according to the invention for use with a facsimile recorder.

Referring to the accompanying drawing, calling signals are assumed to be received over communication line 1 and applied to the input of a band-pass filter 2. This filter 2 is arranged to pass only those frequencies necessary for satisfactory transmission of the calling signals. The output of filter 2 is fed to the input of a demodulator represented by the block 3, the output from which is a series of unidirectional positive pulses corresponding to the envelope of the calling tone signals.

The demodulator output is applied to the control electrode of a gas-filled tube 4 and also to a grid 5 of a four-electrode thermionic vacuum tube 6. The gas-filled tube 4 is provided to register the receipt of any incoming pulse and, in the stand-by condition is inert. Vacuum tube 6 is normally non-conductive and is arranged to conduct only when both its grids 5 and 7 are driven positive simultaneously. The arrival of a first positive pulse from the demodulator will therefore cause the gas-filled tube 4 to ionise and conduct, but will not render tube 6 conductive as there is no positive potential applied to grid 7 of this tube at this time.

When tube 4 conducts, the potential of its anode 8 suffers a negative-going change and this negative-going change is applied to the grid 9 of a vacuum tube 10. Vacuum tube 10 is normally conductive, current flowing from the source 11 through resistor 12 and tube 10 to ground, but the negative-going potential applied to its grid 9 from the anode 8 of tube 4 is sufficient to effect its cut-off. As long as tube 10 was conducting freely the upper terminal of capacitor 13, which is in parallel with tube 10, remained at a relatively low positive potential. However, as soon as tube 10 ceases to conduct, that is immediately as a pulse of 1000 c.p.s., is received by the detector, capacitor 13 begins to charge via resistor 12 from source 11. It is the resultant positive-going excursion of the upper plate of capacitor 13 which is responsible for the generation after a predetermined time, equal to the interval between successive pulses of the calling signal, of the testing pulse.

As capacitor 13 charges it applies an increasing positive potential to the control grids of vacuum tubes 14 and 15. In the stand-by condition when capacitor 13 has only a small positive potential, these tubes 14 and 15 are both cut-off as their cathodes are biased considerably positive by source 16 through a potential divider consisting of resistors 17, 18 and 19. As the cathode of tube 15 is biased more positively than the cathode of tube 14, a greater positive potential has to be applied to the grid of this tube than to the grid of tube 14 before conduction can take place.

The rate of charging of capacitor 13 is approximately constant and is such that a positive potential sufficient to allow tube 14 to conduct is reached after a time equal to the interval between successive pulses of the calling signal. The further positive excursion of the potential applied to the grid of tube 14 by capacitor 13 immediately after tube 14 has started to conduct causes the current through the tube 14 to grow approximately uniformly. The current through the winding 20 of transformer 21 therefore grows uniformly as well, which results in an approximately constant unidirectional potential being generated in winding 22 of transformer 21. The sense of this potential is such that the left-hand terminal of winding 22 suffers a positive-going change.

Shortly after tube 14 has started to conduct, the potential applied to the grids of tubes 14 and 15 by capacitor 13 becomes sufficiently positive to enable tube 15 to start to conduct. Thus a current uniformly increasing in strength is established in winding 23 of transformer 21. This current induces in winding 22 of transformer 21 a unidirectional potential which is opposite in sense and of substantially the same magnitude as that induced by the current previously initiated in winding 20. The aggregate effect of the two potentials induced in winding 22 is therefore to restore the potential of the left-hand terminal of winding 22 to its former value. This terminal can thus be regarded as the source of a unidirectional positive-going pulse of predetermined amplitude, duration and advent, which pulse is the testing pulse used to determine whether the first pulse received by the detector was a genuine calling pulse or not.

After the testing pulse has been generated, the potentials of the grids of tubes 14 and 15 suffer a negative-going change by means which will be described later, and these tubes are restored to the cut-off condition.

The testing pulse generated in winding 22 is applied to grid 7 of vacuum tube 6 and also to the grid of vacuum tube 33. If the first pulse received by the detector was a genuine calling pulse, it would be followed by another calling pulse which would appear at the output of demodulator 3 at the same time as the testing pulse is generated in winding 22 of transformer 21. Thus the grids 5 and 7 of tube 6 will be driven positive simultaneously and tube 6 will conduct, causing relay 24 to operate and to lock itself in the operated condition by means of its contact 25. Relay 24 causes the associated facsimile recorder to commence a message-receiving cycle, by means not shown.

If the first pulse received by the detector was a false one caused by random interference, it will not (to a substantial degree of probability) be followed by another pulse coincident with the testing pulse from winding 22. In this case, therefore, only grid 7 of tube 6 will make a positive excursion and, as this alone is not sufficient to make tube 6 conduct, relay 24 will not be operated and the recorder will not be started.

As already mentioned, the testing pulse is also applied to the grid of vacuum tube 33, and tube 33 is thereby made conductive for the duration of the testing pulse. The conduction from positive source 26 through resistor 27 and tube 33 to ground causes the anode 28 of tube 33 to make a brief negative excursion which is communicated via capacitor 29 to the anode 8 of tube 4. As tube 4 is a gas-filled tube the negative excursion of its anode 8 causes it to deionise and become subject once more to control by its grid.

The termination of the negative excursion of anode 28 of tube 33, together with the deionisation of tube 4, causes the potential of anode 8 of tube 4 to go rapidly more positive until its potential approaches that of source 30. The control grid 9 of tube 10 is thus driven positively so that tube 10 becomes conductive once more. Capacitor 13 then discharges through tube 10 and the potential applied to the grids of tubes 14 and 15 falls rapidly so that tubes 14 and 15 are restored to their non-conductive condition.

If the first pulse received by the detector was a genuine calling pulse then relay 24 was operated and this relay is arranged to send a signal, by means not shown, to the transmitter, as a result of which no more calling pulses are received. The condition of the detector circuit therefore remains undisturbed after relay 24 has operated until the end of the message.

If the first pulse received by the detector was a false pulse, then the condition of the detector after the deionisation of tube 4 is identical with that which existed before the pulse was received. The detector system is therefore ready to respond to the next received pulse.

If a higher degree of security against a false start is desired, the circuit may be extended so that, when a second pulse has been found, a third one is sought and the recorder is set into motion only if a third one is found. In this case relay 24 and its contact 25 would not be included in the anode circuit of tube 6 but in the anode circuit of a tube similar to 6 in a further stage of the circuit.

In an arrangement extended to test for a third pulse, tube 6 would have a resistor in its anode circuit so that when a second pulse is found and tube 6 conducts, as described above, a negative pulse appears at the anode of tube 6. This negative pulse would be inverted to give a positive pulse which would be applied to the control electrode of a gas-filled tube such as 4. The sequence of operations which occur in the circuit described above as a result of the receipt of a first pulse would then be repeated through corresponding apparatus in the further stage of the circuit to generate a second testing pulse for application to one grid of a four electrode tube similar to tube 6. The other grid of this four electrode tube would be connected to the demodulator 3 and, whenever three pulses were received at the correct intervals for calling pulses, this four electrode tube would conduct to operate relay 24 and set the recorder in motion.

Even higher degrees of security may be obtained by further increasing the number of pulses which have to be found at the proper intervals before the recorder is started.

While the principles of the invention have been described above in connection with specific embodiments, and particular modifications thereof, it is to be clearly understood that this description is made only by way of example and not as a limitation on the scope of the invention.

What I claim is:

1. A signal receiving system for assuring response only to signal pulses of a predetermined time spacing, comprising a normally non-conducting gas discharge tube, means for rendering said gas discharge tube conductive in response to a received signal pulse, means responsive to the conductive discharge of said discharge tube for generating a testing pulse a predetermined time after receipt of said pulse, a gating device, means for applying said received signal pulses and said testing pulse to said gating device to render it operative upon simultaneous application of said pulses, and means for applying said testing pulse to said gas discharge tube in parallel with its application to said gating device, to return said tube to its non-conducting condition.

2. A system as claimed in claim 1, in which said means for generating a testing pulse comprises a capacitor, means for charging said capacitor positively at a uniform rate upon the receipt of said first pulse, first and second electron discharge devices each having a cathode, an anode and a control electrode, the cathode of said second device being biased more positively than the cathode of said first device, means for applying the potential of said capacitor to the control grids of said devices, a transformer having first and second primary coils in the respective anode circuits of said first and second devices, said primary coils being arranged to induce potentials in opposition to one another in a secondary of said transformer when said devices are conducting, the secondary being coupled to said gating device and to said means-for-applying said testing pulse to said gas discharge tube.

3. A system as claimed in claim 1, in which said gating device comprises an electron discharge device having a cathode, an anode and two grid electrodes, said device being conductive only when positive potentials are applied to both said grid electrodes, further comprising a relay connected to said gating circuit and operative in response to the presence of positive potentials on both said grid electrodes.

4. A system as claimed in claim 1, in which said means for applying said testing pulse to said discharge tube comprises an electron discharge device having a cathode, an anode and a control electrode, means for applying the testing pulse to said control electrode to produce a negative pulse in an output circuit of said electron discharge device, and further means for applying said negative pulse to deionise said gas-filled tube.

References Cited in the file of this patent

UNITED STATES PATENTS

| | | |
|---|---|---|
| 2,344,792 | Swezey | Mar. 21, 1944 |
| 2,495,131 | Poulter | Jan. 17, 1950 |
| 2,670,463 | Raymond | Feb. 23, 1954 |
| 2,672,556 | Leighton | Mar. 16, 1954 |
| 2,701,305 | Hopper | Feb. 1, 1955 |
| 2,719,226 | Gordon | Sept. 27, 1955 |
| 2,739,180 | Britt | Mar. 20, 1956 |